United States Patent [19]

Okazaki et al.

[11] Patent Number: 5,171,070
[45] Date of Patent: Dec. 15, 1992

[54] ANTISKID BRAKE SYSTEM FOR VEHICLE

[75] Inventors: Haruki Okazaki; Fumio Kageyama; Toru Onaka; Yoji Kurihara, all of Hiroshima

[73] Assignee: Mazda Motor Corporation, Hiroshima, Japan

[21] Appl. No.: 796,601

[22] Filed: Nov. 22, 1991

[30] Foreign Application Priority Data

Nov. 30, 1990 [JP] Japan ................... 2-338326

[51] Int. Cl.⁵ .............................................. B60T 8/32
[52] U.S. Cl. .................... 303/103; 303/104; 303/106; 303/110; 303/108; 303/109
[58] Field of Search ............... 303/110, 106, 105, 108, 303/109, 103, 104, 97, 96, 98, 99, 100, 102, 107, 111; 188/181 A, 181 R; 180/197; 364/426.01, 426.02, 426.03

[56] References Cited

U.S. PATENT DOCUMENTS

| | | | |
|---|---|---|---|
| 4,054,328 | 10/1977 | Leiber et al. | 303/106 X |
| 4,135,769 | 1/1979 | Williams et al. | 303/106 |
| 4,164,360 | 8/1979 | Jones | 303/106 X |
| 4,585,280 | 4/1986 | Leiber | 303/110 X |
| 4,763,260 | 8/1988 | Sakuma et al. | 303/105 X |
| 4,807,941 | 2/1989 | Onogi et al. | 303/108 |
| 4,825,371 | 4/1989 | Hoashi et al. | 303/106 X |
| 4,832,415 | 5/1989 | Shinomiya | 303/110 X |
| 4,883,325 | 11/1989 | Shimanuki et al. | 303/105 X |
| 4,984,164 | 1/1991 | Maehara et al. | 303/110 X |
| 4,986,611 | 1/1991 | Goshima et al. | 303/106 X |
| 5,028,095 | 7/1991 | Okubo et al. | 303/106 X |
| 5,082,333 | 1/1992 | Fukushima et al. | 303/103 X |

FOREIGN PATENT DOCUMENTS

| | | |
|---|---|---|
| 3731075 | 3/1989 | Fed. Rep. of Germany . |
| 4016659 | 11/1990 | Fed. Rep. of Germany . |
| 4016668 | 11/1990 | Fed. Rep. of Germany . |
| 57-4544 | 1/1982 | Japan . |
| 0166152 | 7/1987 | Japan ................... 303/110 |
| 0038072 | 2/1988 | Japan ................... 303/110 |
| 1311942 | 6/1989 | Japan . |
| 1148648 | 12/1989 | Japan . |
| 2061435 | 5/1981 | United Kingdom ........... 303/110 |

OTHER PUBLICATIONS

Bosch Technische Berichte, English edition (Feb. 1982), ISSN 0006-789X, pp. 78-82.

Primary Examiner—Douglas C. Butler
Attorney, Agent, or Firm—Sixbey, Friedman, Leedom & Ferguson

[57] ABSTRACT

In an antiskid brake system for a vehicle, the braking pressure applied to a wheel is reduced when the deceleration of the rotational speed of the wheel reaches a predetermined value and is increased when the acceleration of the rotational speed of the wheel reaches a predetermined value after reduction of the braking pressure. In a low vehicle speed range lower than a predetermined vehicle speed, the braking pressure is increased at a predetermined rate when the acceleration of the rotational speed of the wheel reaches the predetermined value after reduction of the braking pressure. The predetermined rate is independent from the rotational speed of the wheel and is changed with the friction coefficient of the road surface so that it reduces as the friction coefficient of the road surface reduces.

9 Claims, 6 Drawing Sheets

ANTISKID BRAKE SYSTEM FOR VEHICLE

BACKGROUND OF THE INVENTION

1. Field of the Invention

This invention relates to an antiskid brake system for a vehicle which controls brake fluid pressure so that an excessively large braking force is not applied to the wheels of the vehicle during braking, and more particularly to an antiskid brake system in which the brake fluid pressure is periodically increased and reduced according to the wheel speeds detected by wheel speed sensors.

1. Description of the Prior Art

There has been known an antiskid brake system which prevents the wheels from locking during braking, thereby preventing skid of the wheels. As disclosed, for instance, in Japanese Patent Publication No. 57(1982)-4544, the antiskid brake system basically comprises an electromagnetic control valve which is provided in the brake fluid system and controls the brake fluid pressure, wheel speed sensors which detect the rotational speeds of the wheels, and a control unit which controls the electromagnetic control valve to reduce the brake fluid pressure when locking of the wheels is detected through the wheel speeds. For example, the control unit calculates acceleration or deceleration of the wheels on the basis of the wheel speeds, calculates slip ratios of the wheels on the basis of the wheel speeds and a pseudo-vehicle-speed of the vehicle calculated on the basis of the wheel speeds, and causes the electromagnetic control valve to reduce the brake fluid pressure when the deceleration of the wheels becomes small than predetermined deceleration or when the slip ratios of the wheels reach a predetermined value while causes the electromagnetic valve to increase the brake fluid pressure when the rotational speeds of the wheels increases and the acceleration of the wheel speeds reaches a predetermined value after reduction of the brake fluid pressure. The control unit repeats such a control (will be referred to as "the antiskid control", hereinbelow) until the vehicle stops. The antiskid brake system prevents locking or skid of the wheels during hard braking, thereby stopping the vehicle in a short distance without the vehicle losing directional stability.

The wheel speed sensor which is employed in the antiskid brake system to detect the wheel speed measures the angle over which the wheel rotates per unit time. This kind of wheel speed sensor has a drawback that the measuring accuracy deteriorates as the rotational speed of the wheel lowers, and accordingly, the vehicle speed at a very low speed immediately before stop cannot be accurately estimated and the brake system provided with the antiskid brake system can operate just as a normal brake system without antiskid brake system at the worst.

On normal road having a relatively large surface friction coefficient, this problem may be overcome by interrupting the antiskid control when the wheel speeds lower to a predetermined value. That is, when the surface friction coefficient is large, the road surface gripping force of the wheels is strong and the wheels do not lock or skid even if a braking pressure proportional to the brake pedal pressing pressure directly acts on the brake fluid system.

However on road having small surface friction coefficient such as frozen road, the road surface gripping force of the wheels is poor, and the wheels are apt to lock or skid when the braking pressure sharply increases, whereby stability of the vehicle is lost.

SUMMARY OF THE INVENTION

In view of the foregoing observations and description, the primary object of the present invention is to provide an antiskid brake system which can stably stop a vehicle irrespective of the road surface friction coefficient.

In accordance with the present invention, in an antiskid brake system in which the braking pressure is reduced when a wheel-speed-based value obtained from a rotational speed of a wheel detected by a wheel speed sensor reaches a predetermined value and is increased when the acceleration of the rotational speed of the wheel reaches a predetermined value after reduction of the braking pressure, the braking pressure is increased at a predetermined rate when the acceleration of the rotational speed of the wheel reaches said predetermined value after reduction of the braking pressure in a low vehicle speed range lower than a predetermined vehicle speed, said predetermined rate being independent from the rotational speed of the wheel and being changed with the friction coefficient of the road surface so that it reduces as the friction coefficient of the road surface reduces.

Said wheel-speed-based value may be the deceleration of the rotational speed of the wheel, the slip ratio of the wheel, or any other suitable value which can be obtained based on the rotational speed of the wheel.

In the antiskid brake system of the present invention, since, in the low vehicle speed range, the braking pressure is increased at a predetermined rate which is independent from the rotational speed of the wheel detected by the wheel speed sensor but is changed according to the friction coefficient of the road surface, locking or skid of the wheel can be effectively prevented irrespective of the friction coefficient of the road surface even in the low vehicle speed range where the measuring accuracy of the wheel speed sensor deteriorates.

DESCRIPTION OF THE PREFERRED EMBODIMENT

Figure 1:
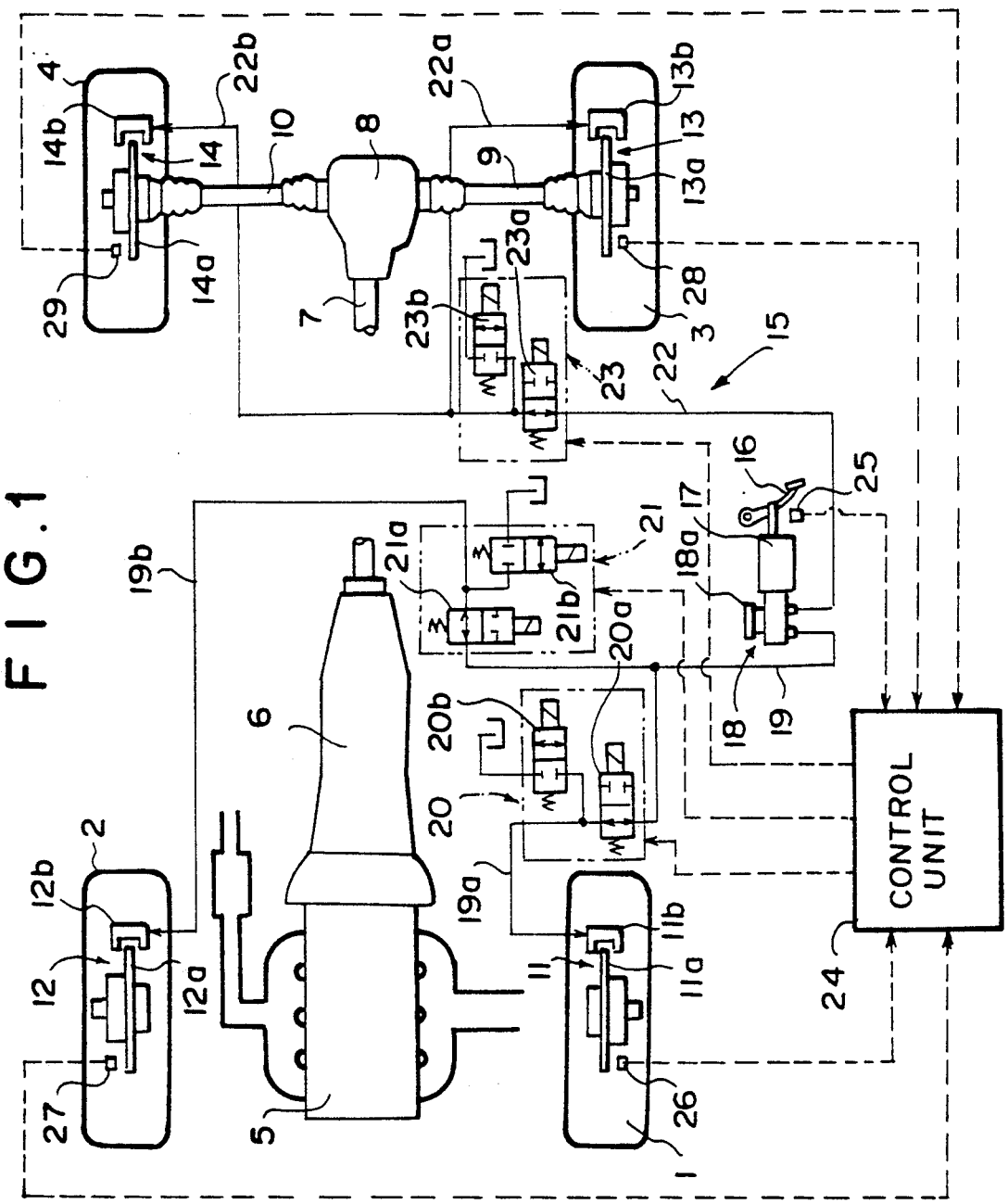
FIG. 1 is a schematic view showing a vehicle provided with an antiskid brake system in accordance with an embodiment of the present invention.

In FIG. 1, a vehicle provided with an antiskid brake system in accordance with an embodiment of the present invention has left and right front wheels 1 and 2 and left and right rear wheels 3 and 4. In this particular embodiment, the rear wheels 3 and 4 are driving wheels, and the output torque of an engine 5 is transmitted to the rear wheels 3 and 4 through an automatic transmission 6, a propeller shaft 7, a differential 8 and left and right driving shafts 9 and 10.

The wheels 1 to 4 are provided with brake devices 11 to 14 which comprise disks 11a to 14a and calipers 11b to 14b. A brake control system 15 controls the brake devices 11 to 14.

The brake control system 15 comprises a booster 17 which increases pressing pressure of a brake pedal 16 by the driver and a master cylinder 18 which produces a braking pressure according to the brake pedal pressing pressure which has been increased by the booster 17. A front brake line 19 connected to the master cylinder 18 branches into left and right front brake lines 19a and 19b which respectively leads to the calipers 11b and 12b of the left and right front brake devices 11 and 12. The left and right front brake lines 19 and 19b are respectively provided with first and second valve units 20 and 21. The first valve unit 20 comprises an electromagnetic on-off valve 20a and an electromagnetic relief valve 20b, and the second valve unit 21 comprises an electromagnetic on-off valve 21a and an electromagnetic relief valve 21b.

A rear brake line 22 connected to the master cylinder 18 is provided with a third valve unit 23 which comprises an electromagnetic on-off valve 23a and an electromagnetic relief valve 23b like the first and second valve units 20 and 21. The rear brake lines 22 branches downstream of the third valve unit 23 into left and right rear brake lines 22a and 22b which respectively leads to the calipers 13b and 14b of the left and right rear brake devices 13 and 14. That is, the brake control system 15 in this embodiment has a first channel which controls the braking pressure in the left front brake device 11 by way of the first valve unit 20, a second channel which controls the braking pressure in the right front brake device 12 by the way of the second valve unit 21, and a third channel which controls the braking pressure in the left and right rear brake devices 13 and 14 by way of the third valve unit 23. The first to third channels are controlled independently from each other.

The brake control system 15 is provided with a control unit 24 which controls the first to third channels. A brake signal representing whether the brake pedal 16 is depressed detected by a brake switch 25 and wheel speed signals representing the wheel speeds of the respective wheels 1 to 4 detected by wheel speed sensors 26 to 29 are input into the control unit 24, and the control unit 24 outputs braking pressure control signals determined on the basis of the signals to the first to third valve units 20, 21 and 23, thereby performing the antiskid control on the left front wheel 1, the right front wheel 2 and the left and right rear wheels 3 and 4 respectively by way of the first to third channels in parallel to each other. That is, the control unit 24 applies to the wheels 1 to 4 braking force according to the degree of slip of the respective wheels by opening and closing the on-off valves 20a, 21a and 23a and the relief valves 20b, 21b and 23b of the first to third valve units 20, 21 and 23 by duty control of the valves on the basis of the wheels speeds represented by the wheel speed signals from the wheel speed sensors 26 to 29. The brake fluid discharged through the relief valves 20b, 21b and 23b returns to a reservoir 18a of the master cylinder 18 through a drain line (not shown).

While the antiskid control is not being effected, the control unit 24 outputs no braking pressure control signal, and accordingly the relief valves 20b, 21b and 23b of the first to third valve units 20, 21 and 23 are kept closed and the on-off valves 20a, 21a and 23a are kept open as shown in FIG. 1. In this state, the braking pressure produced in the master cylinder 18 according to the brake pedal pressing pressure is directly fed to the brake devices 11 to 14 through the front brake line 19 and the rear brake line 22, and braking force corresponding to the braking pressure is applied to the front and rear wheels 1 to 4.

The braking control performed by the control unit 24 will be briefly described, hereinbelow.

The control unit 24 calculates the acceleration and the deceleration of each wheel speed on the basis of the corresponding wheel speed signal. The control unit 24 divides the difference between the preceding value and the present value of the wheel speed by the sampling interval $\Delta t$ (e.g., 7ms), and adopts the value obtained by converting the quotient to the gravitational acceleration as the acceleration or the deceleration of the wheel speed.

Further the control unit 24 determines whether the vehicle is running rough road by a predetermined rough road determining process which is executed, for instance, as follows. That is, when the number of times the acceleration or the deceleration of the rear wheels 3 and 4 exceeds a predetermined upper limit or lower limit in a predetermined time interval is smaller than a preset value, the control unit 24 determines that the vehicle is not running rough road, and otherwise, the control unit 24 determines that the vehicle is running rough road.

In this particular embodiment, the control unit 24 adopts the smaller one of the wheel speeds of the left and rear wheels 3 and 4 as the "rear wheel speed" taking into account the detection error of the wheel speed sensors 28 and 29, and adopts the acceleration and the deceleration obtained on the basis of the "rear wheel speed" as the rear wheel acceleration and rear wheel deceleration.

Further the control unit 24 estimates the friction coefficient of the road surface for each wheel and at the same time calculates the pseudo-vehicle-speed.

The control unit 24 calculates the slip ratio for the first to third channels according to formula slip ratio=(wheel speed/pseudo-vehicle-speed)×100 on the basis of the rear wheel speed and the left and right front wheel speeds. That is, as the deviation of the wheel speed from the pseudo-vehicle-speed increases, the slip ratio decreases and the degree of slip of the wheel increases.

Then the control unit 24 sets various controlling threshold values which are used for control of the first to third channels.

For example, the control unit 24 sets the threshold values in the following manner. That is, the control unit 24 selects the controlling threshold values corresponding to the friction coefficient and the pseudo-vehicle-speed from various controlling threshold values which have been set according to the vehicle speed range and the friction coefficient of the road surface, and corrects the selected controlling threshold values according to whether the vehicle is running rough road, and the like. As such controlling threshold values, for example, those for shifting the phases of the antiskid control are set according to the friction coefficient of the road surface and the vehicle speed range. In this particular embodiment, the phases of the antiskid control are divided into six phases, phase 0 which represents that the antiskid control is not to be effected, phase I which represents that the braking pressure is to be increased in the antiskid control, phase II which represents that the braking pressure is to be fixed after increase, phase III which represents that the braking pressure is to be reduced, phase IV which represents that the braking pressure is to be abruptly reduced and phase V which represents that the braking pressure is to be fixed after reduction, and the control unit 24 selects one of the phases according to comparison of the controlling threshold values with the wheel speed acceleration or deceleration and/or the slip ratio. For this purpose, the control unit 24 sets, according to the vehicle speed range and the friction coefficient of the road surface, 0-2 deceleration threshold value $B_{02}$ for determining shift from the phase 0 to the phase II, 1-2 deceleration threshold value $B_{12}$ for determining shift from the phase I to the phase II, 2-3 deceleration threshold value $B_{23}$ for determining shift from the phase II to the phase III, 3-5 deceleration threshold value $B_{35}$ for determining shift from the phase III to the phase V, 5-1 slip ratio threshold value Bsz for determining shift from the phase V to the phase I, initial slip ratio threshold value Bi for the first cycle immediately after beginning of the antiskid control, and the like. The deceleration threshold values which affects the braking effect to a large extent are set to approach 0G as the friction coefficient of the road surface decreases in order to improve both the braking performance at a large friction coefficient of the road surface and the response to control at a small friction coefficient of the road surface.

The control unit 24 further determines whether the wheel tends to lock in the following manner. For example, for the first channel, the control unit 24 first sets the preceding value of continuation flag $F_{CON1}$ for the first channel (the purpose of which will become apparent later) as the present value of the same, and then determines whether the pseudo-vehicle-speed $V_R$ and the wheel speed $W_1$ (of the left front wheel) satisfy a predetermined condition (e.g., $V_R<5Km/h$ and $W_1<7.5Km/h$). When they satisfy the predetermined condition, the control unit 24 resets the continuation flag $F_{CON1}$ and lock flag $F_{LOK1}$ to 0, and when they do not satisfy the predetermined condition, the control unit 24 determines whether the lock flag $F_{LOK1}$ has been set to 1. When the lock flag $F_{LOK1}$ has not been set to 1, the control unit 24 sets the lock flag $F_{LOK1}$ to 1 when a predetermined condition is satisfied, e.g., when the pseudo-vehicle-speed $V_R$ is higher than the wheel speed $W_1$.

On the other hand, when the lock flag $F_{LOK1}$ has been set to 1, the control unit 24 sets the continuation flag $F_{CON1}$ to 1, for instance, when the phase value $P_1$ for the first channel is 5 (representing the phase V) and the slip ratio $S_1$ of the left front wheel is larger than 90%.

Whether the wheel tends to lock is determined in the similar manner for the second and third channels.

Further the control unit 24 whether cascade lock of the wheel tends to occur. The cascade lock is a phenomenon that lock of the wheel repeatedly occurs in a short time on a low friction coefficient road, and the control unit 24 sets cascade flag $F_{CAS}$ to 1 when a predetermined condition for causing the cascade lock is satisfied.

Then the control unit 24 sets controlled variables for the phase values which are set for each of the first to third channels and outputs braking force control signals corresponding to the controlled variables to the first to third valve units 20, 21 and 23. Thus the braking pressures in the left and right front brake lines 19a and 19b downstream of the first and second valve units 20 and 21 and left and right rear brake lines 22a and 22b are increased, reduced or fixed.

The manner of estimating the friction coefficient of the road surface will be described in conjunction with the first channel by way of example, hereinbelow.

Figure 2:
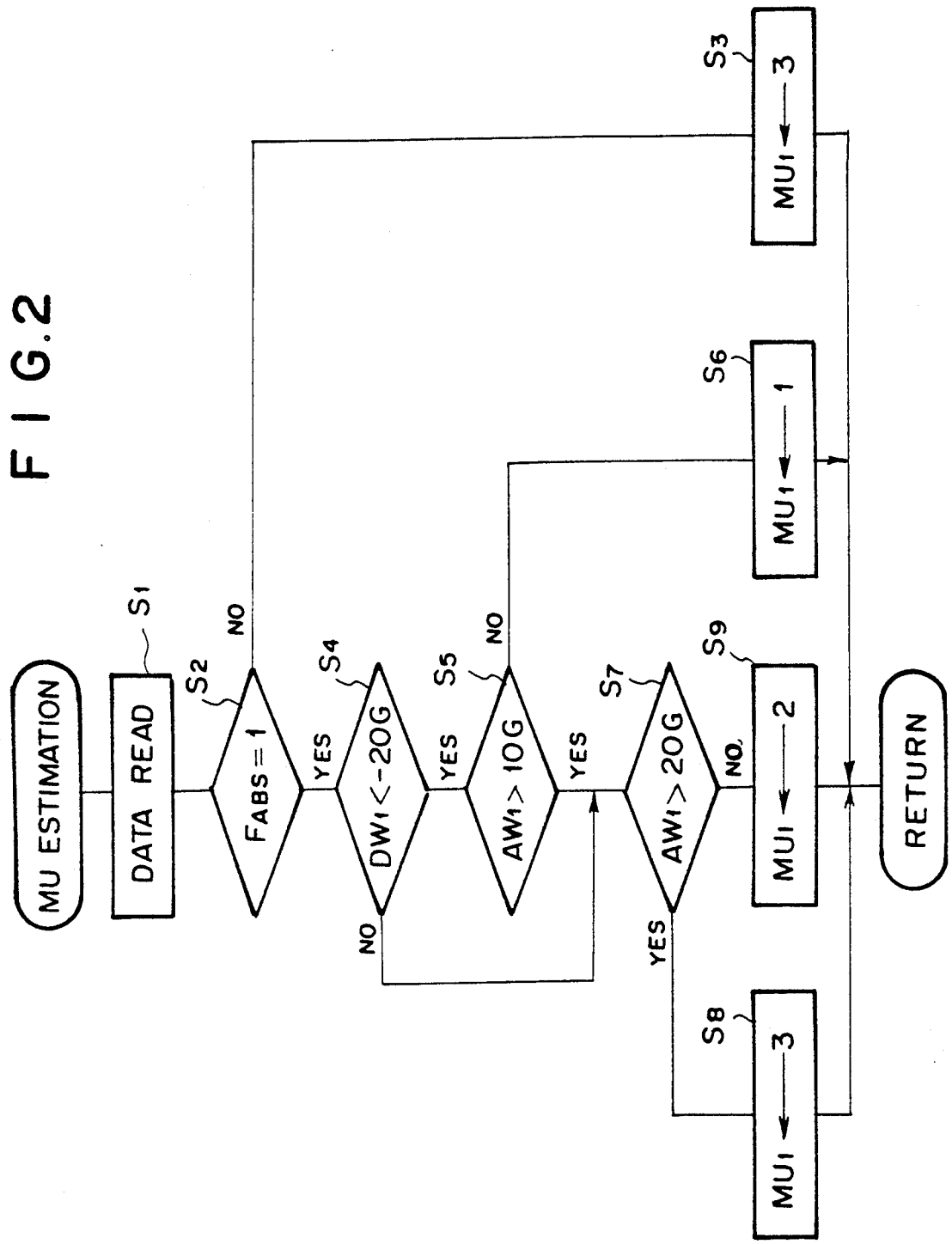
FIG. 2 is a flow chart for estimating the friction coefficient of the road surface.

In FIG. 2, the control unit 24 first reads various data in step S1, and determines in step S2 whether ABS flag $F_{ABS}$ is 1, the ABS flag $F_{ABS}$ being set to 1 to indicate that the antiskid control is being performed. The ABS flag $F_{ABS}$ is set to 1 when at least one of the lock flags $F_{LOK1}$, $F_{LOK2}$ and $F_{LOK3}$ for the first to third channels is set to 1, and is reset to 0 when the brake switch 25 is turned off. When it is determined in step S2 that the ABS flag $F_{ABS}$ is not 1, the control unit 24 sets the friction coefficient $MU_1$ to 3 which indicates that the road surface has a large friction coefficient. (step S3)

On the other hand, when it is determined in step S2 that the ABS flag $F_{ABS}$ is 1, that is, that the antiskid control is being performed, the control unit 24 determines in step S4 whether the wheel speed deceleration $DW_1$ in the preceding cycle is smaller than $-20G$. When it is determined that the wheel speed deceleration $DW_1$ in the preceding cycle is smaller than $-20G$, the control unit 24 determines in step S5 whether the wheel speed acceleration $AW_1$ in the preceding cycle is larger than 10G. When it is determined in step S5 that the wheel speed acceleration $AW_1$ in the preceding cycle is not larger than 10G, the control unit 24 sets the friction coefficient $MU_1$ to 1 which indicates that the road surface has a small friction coefficient. (step S6).

On the other hand, when it is determined in step S4 that the wheel speed deceleration $DW_1$ in the preceding cycle is not smaller than $-20G$, the control unit 24 directly proceeds to step S7 and determines whether the wheel speed acceleration $AW_1$ in the preceding cycle is larger than 20G. When it is determined that the wheel speed acceleration $AW_1$ in the preceding cycle is larger than 20G, the control unit 24 sets the friction coefficient $MU_1$ to 3 in step S8, and otherwise, the control unit 24 sets the friction coefficient $MU_1$ to 2 which indicates that the road surface has an intermediate friction coefficient. (step S9).

Figure 3:
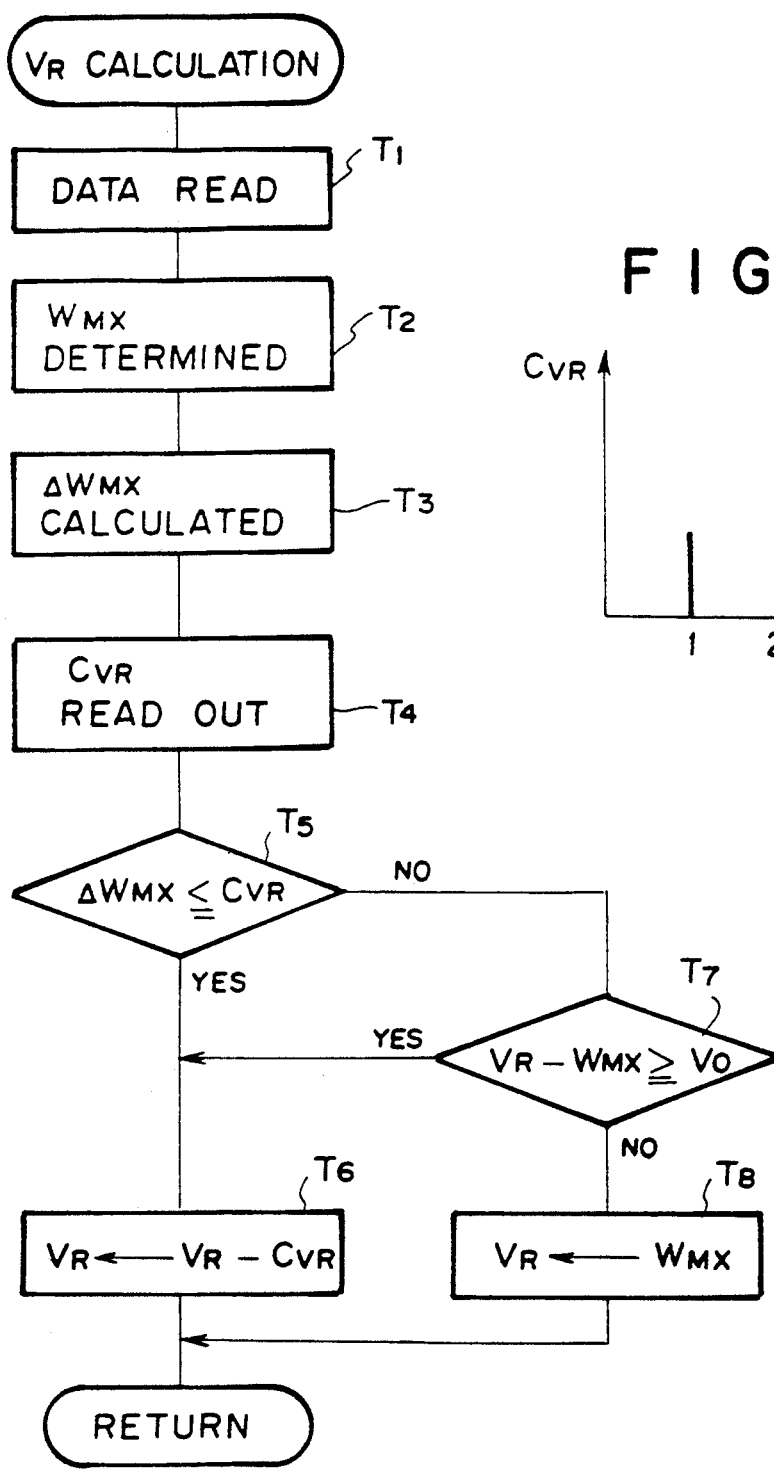
FIG. 3 is a flow chart for calculating the pseudo-vehicle-speed.

The control unit 24 calculates the pseudo-vehicle-speed VR in the manner shown by the flow chart in FIG. 3.

The control unit 24 first reads various data in step T1, and determines in step T2 a maximum wheel speed $W_{MX}$ which is the highest of the wheel speeds $W_1$ to $W_4$ represented by the signals from the wheel speed sensors 26 to 29. Then the control unit 24 calculates the rate of change $\Delta W_{MX}$ of the maximum wheel speed (per sampling interval $\Delta t$) in step T3.

Figure 4:
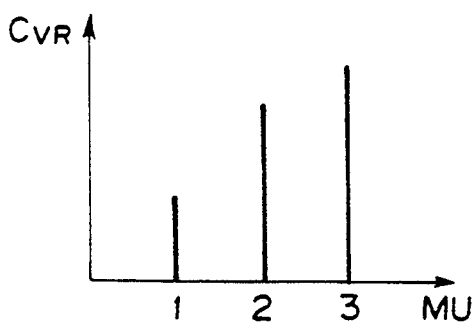
FIG. 4 is a view for illustrating the map which is used in calculating the pseudo-vehicle-speed.

Then the control unit 24 reads out vehicle speed correction value $C_{VR}$ determined based on the friction coefficient MU according to the map shown in FIG. 4. (step T4) The control unit 24 then determines in step T5 whether the rate of change $\Delta W_{MX}$ is smaller than the vehicle speed correction value $C_{VR}$. When it is determined that the former is smaller than the latter, the control unit 24 sets the value obtained by subtracting the vehicle speed correction value $C_{VR}$ from the preceding value of the pseudo-vehicle-speed $V_R$ (e.g., the maximum wheel speed in the wheel speeds of the wheels which are not slipping) as the present value of the pseudo-vehicle-speed $V_R$. (step T6) In this case, the pseudo-vehicle-speed $V_R$ reduces at a rate determined by the vehicle speed correction value $C_{VR}$.

On the other hand, when it is determined in step T5 that the rate of change $\Delta W_{MX}$ is larger than the vehicle speed correction value $C_{VR}$, that is, when the maximum wheel speed $W_{MX}$ changes by an excessively large amount, the control unit 24 determines in step T7 whether the value obtained by subtracting the maximum wheel speed $W_{MX}$ from the pseudo-vehicle-speed $V_R$ is larger than a predetermined value $V_o$. That is, the control unit 24 determines whether the maximum wheel speed $W_{MX}$ deviates from the pseudo-vehicle-speed $V_R$ by a large amount. When it is determined that the difference therebetween is not so large, the control unit 24 sets in step T6 the value obtained by subtracting the vehicle speed correction value $C_{VR}$ from the preceding value of the pseudo-vehicle-speed $V_R$ as the present value of the pseudo-vehicle-speed $V_R$.

On the other hand, when it is determined that the difference between the maximum wheel speed $W_{MX}$ and the pseudo-vehicle-speed $V_R$ large, the control unit 24 sets the maximum wheel speed $W_{MX}$ as the present value of the pseudo-vehicle-speed $V_R$. (step T8)

In this manner, the value of the pseudo-vehicle-speed $V_R$ is updated every sampling interval $\Delta t$.

The braking pressure control will be described in conjunction with the first channel with reference to FIG. 5 by way of example.

Figure 5:
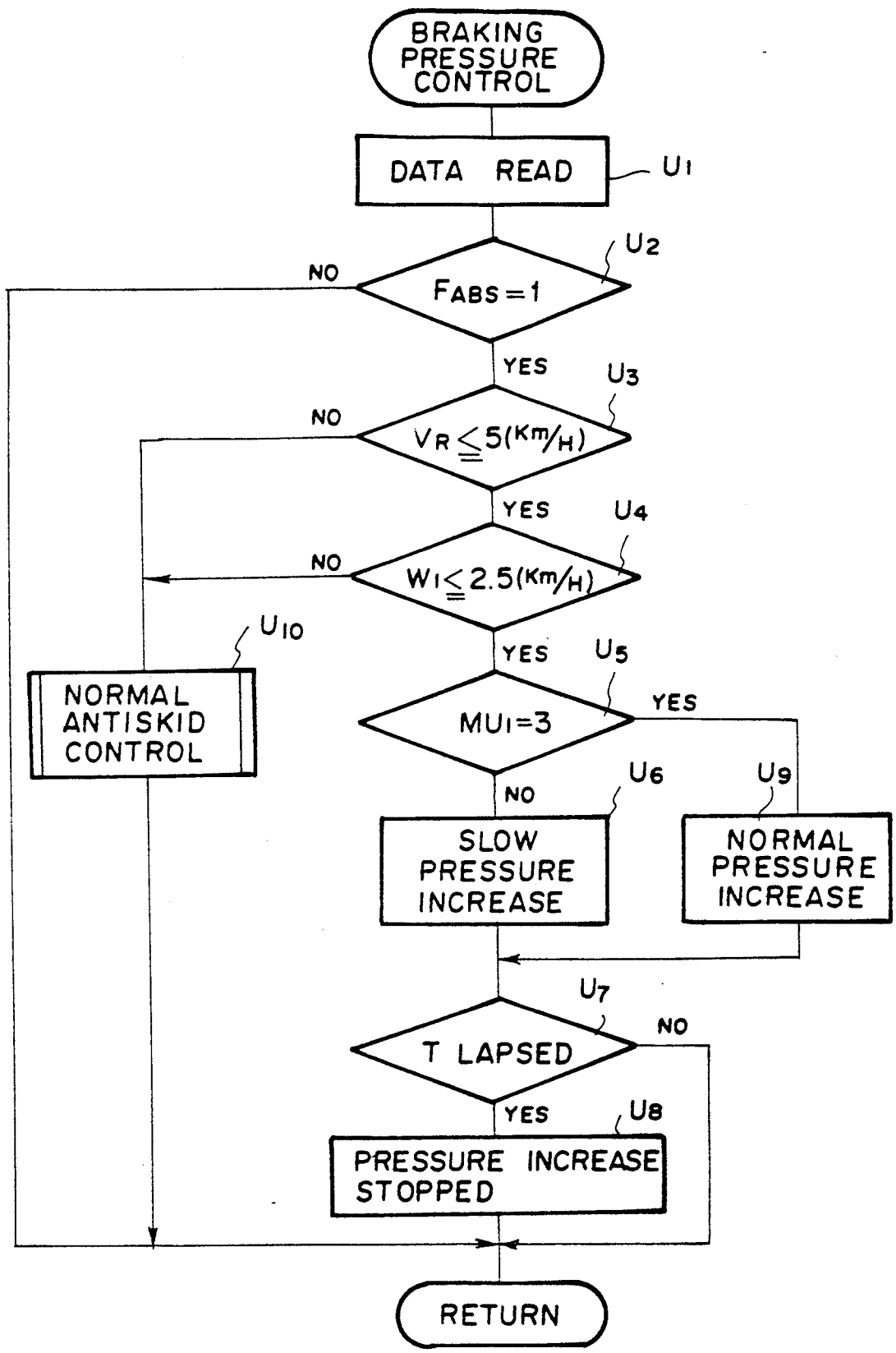
FIG. 5 is a flow chart for illustrating the control of the braking pressure.

In FIG. 5, the control unit 24 first reads various data in step U1, and determines in step U2 whether ABS flag $F_{ABS}$ is 1. When it is determined that the ABS flag $F_{ABS}$ is 1, the control unit 24 determines in step U3 whether the pseudo-vehicle-speed $V_R$ is lower than 5Km/h, and when it is determined that the former is lower than the latter, the control unit 24 determines in step U4 whether the wheel speed $W_1$ is lower than 2.5Km/h. When it is determined that the former is lower than the latter, the control unit 24 determines in step U5 whether the friction coefficient $MU_1$ has been set to 3. When it is determined that the friction coefficient $MU_1$ has not been set to 3, the control unit 24 sets a controlled variable to a value for slowly increasing the braking pressure, and interrupts increasing the braking pressure on the basis of the controlled variable for slowly increasing the braking pressure after a predetermined time T (e.g., 500ms) lapses. (steps U7 and U8)

On the other hand, when it is determined in step U5 that the friction coefficient $MU_1$ has been set to 3, the control unit 24 sets in step U9 the controlled variable to a value for increasing the braking pressure at a normal rate, and then proceeds to steps U7 and U8. The controlled variable for slowly increasing the braking pressure and the controlled variable for increasing the braking pressure at a normal rate are fixed values and the latter is larger than the former. The controlled variables may be the duty ratios of the on-off valve 20a of the first valve unit 20.

When it is determined in step U3 that the pseudo-vehicle-speed $V_R$ is not lower than 5Km/h, or when it is determined in step U4 that the wheel speed $W_1$ is not lower than 2.5Km/h, the control unit 24 performs in step U10 the normal antiskid control in step U10.

The braking pressure control is performed in the similar manner for the second and third channels.

The operation of the antiskid brake system of this embodiment will be described hereinbelow in conjunction with the first channel by way of example.

Figure 6:
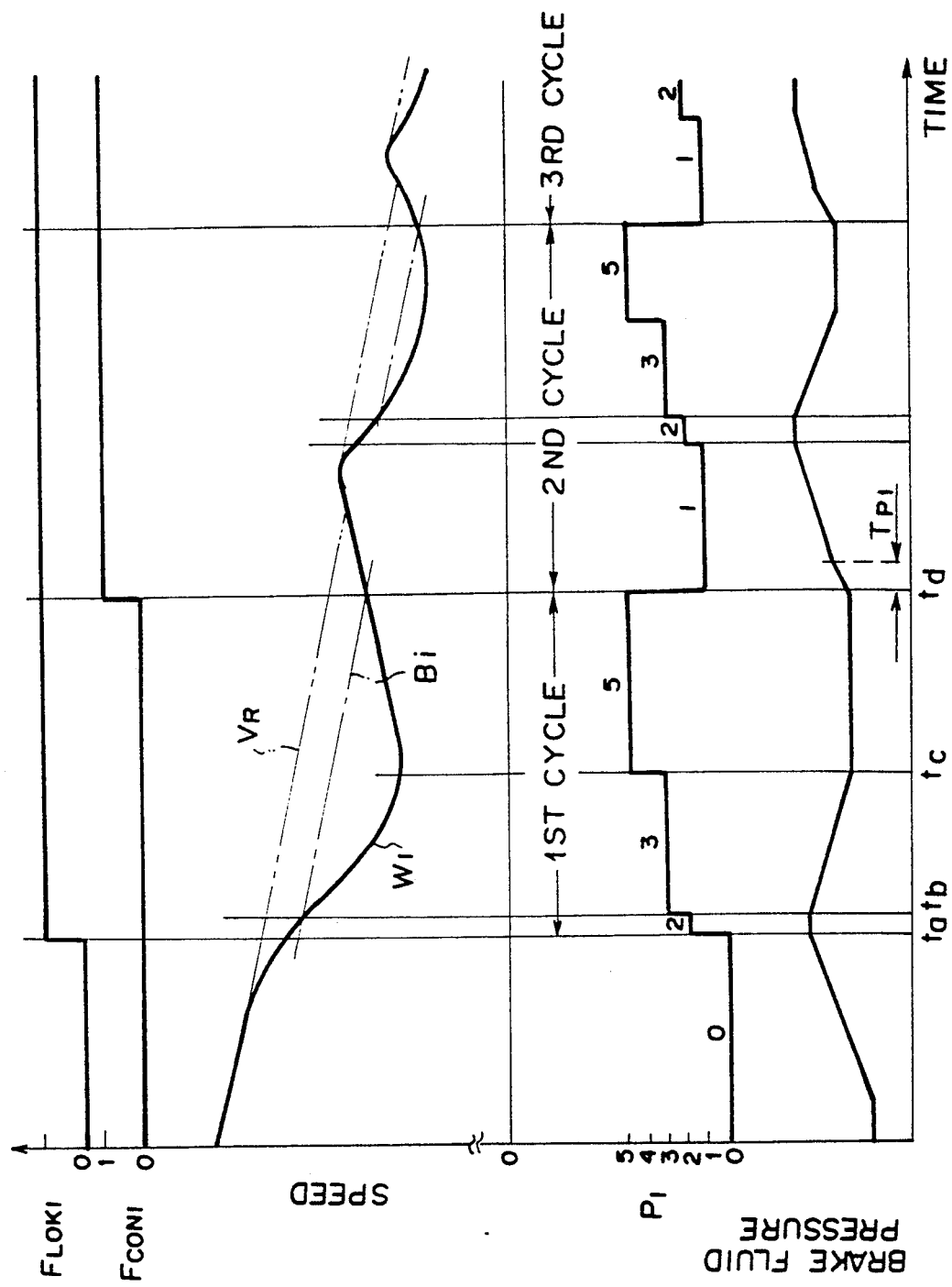
FIGS. 6 and 7 are time charts for illustrating the operation of the antiskid brake system of this embodiment.

When the brake pedal 16 is depressed while the antiskid control is not being effected, and the braking pressure produced by the master cylinder 18 gradually increases, whereby the wheel speed deceleration $DW_1$ reaches $-3G$ at time $t_a$ in FIG. 6, the lock flag $F_{LOK1}$ is set to 1 and the antiskid control is initiated. Since the friction coefficient MU has been set to 3 in the first cycle after initiation of the antiskid control as described above, the control unit 24 sets the controlling threshold values corresponding to the high friction coefficient road.

The control unit 24 compares the slip ratio $S_1$ the wheel speed deceleration $DW_1$ and the wheel speed acceleration $AW_1$ calculated on the basis of the wheel speed $W_1$ with the controlling threshold values. If the initial slip ratio threshold value Bi is set, for instance, to 90% and the slip ratio $S_1$ at that time is 96%, the control unit 24 changes the phase value $P_1$ from 0 to 2, thereby fixing the braking pressure at the level at time $t_a$. Then, when the slip ratio $S_1$ reduces below 90% at time $t_b$, the control unit 24 changes the phase value $P_1$ from 2 to 3. This causes the relief valve 20b of the first valve unit 20 to open and close according to a predetermined duty ratio, whereby the braking pressure reduces at a predetermined rate and the left front wheel 1 begins to recover the rotating force.

When the braking pressure is further reduced and both the wheel speed deceleration $DW_1$ and the wheel speed acceleration $AW_1$ become 0 (at time $t_c$), the control unit 24 changes the phase value $P_1$ from 3 to 5, whereby the braking pressure is fixed at the value at time $t_c$.

When the phase value $P_1$ is kept at 5 and the slip ratio $S_1$ exceeds 90% at time $t_d$, the control unit 24 sets the continuation flag $F_{CON1}$ to 1. Thus the antiskid control for the first channel goes into the second cycle from time $t_d$. In this case, the control unit 24 changes the phase value $P_1$ to 1 irrespective of other conditions.

For a predetermined time $T_{PZ}$ immediately after shift to the phase I, the on-off valve 20a of the first valve unit 20 is opened and closed at 100% duty ratio and the braking pressure is rapidly increased. The predetermined time $T_{PZ}$ is determined depending on the duration of the phase V in the first cycle. Thereafter, the on-off valve 20a is opened and closed at a predetermined duty ratio and the braking pressure gradually increases at a rate smaller than that during the redetermined time $T_{PZ}$.

In the second and cycle and thereafter, a proper friction coefficient $MU_1$ is set on the basis of the wheel speed deceleration $DW_1$, the wheel speed acceleration $AW_1$ and the like in the preceding cycle according to the flow chart shown in FIG. 2, and the controlling threshold values are set according to the proper friction coefficient $MU_1$ thus set. Accordingly, the braking pressure is finely controlled according to the running condition of the vehicle.

When the control unit 24 determines that the slip ratio $S_1$ is larger than the 5-1 slip ratio threshold value $B_{SZ}$ while the phase of the antiskid control is in the phase V, the control unit 24 sets the phase value $P_1$ to 1, thereby causing the antiskid control to go into the third cycle.

When the wheel speed $W_1$ lowers below 2.5zkm/h and at the same time, the pseudo-vehicle-speed $V_R$ lowers below 5Km/h at time $t_e$ in FIG. 7, the control unit 24 resets both the lock flag $F_{LOK1}$ and the continuation flag $F_{CON1}$ and shifts to an ending process.

Figure 7:
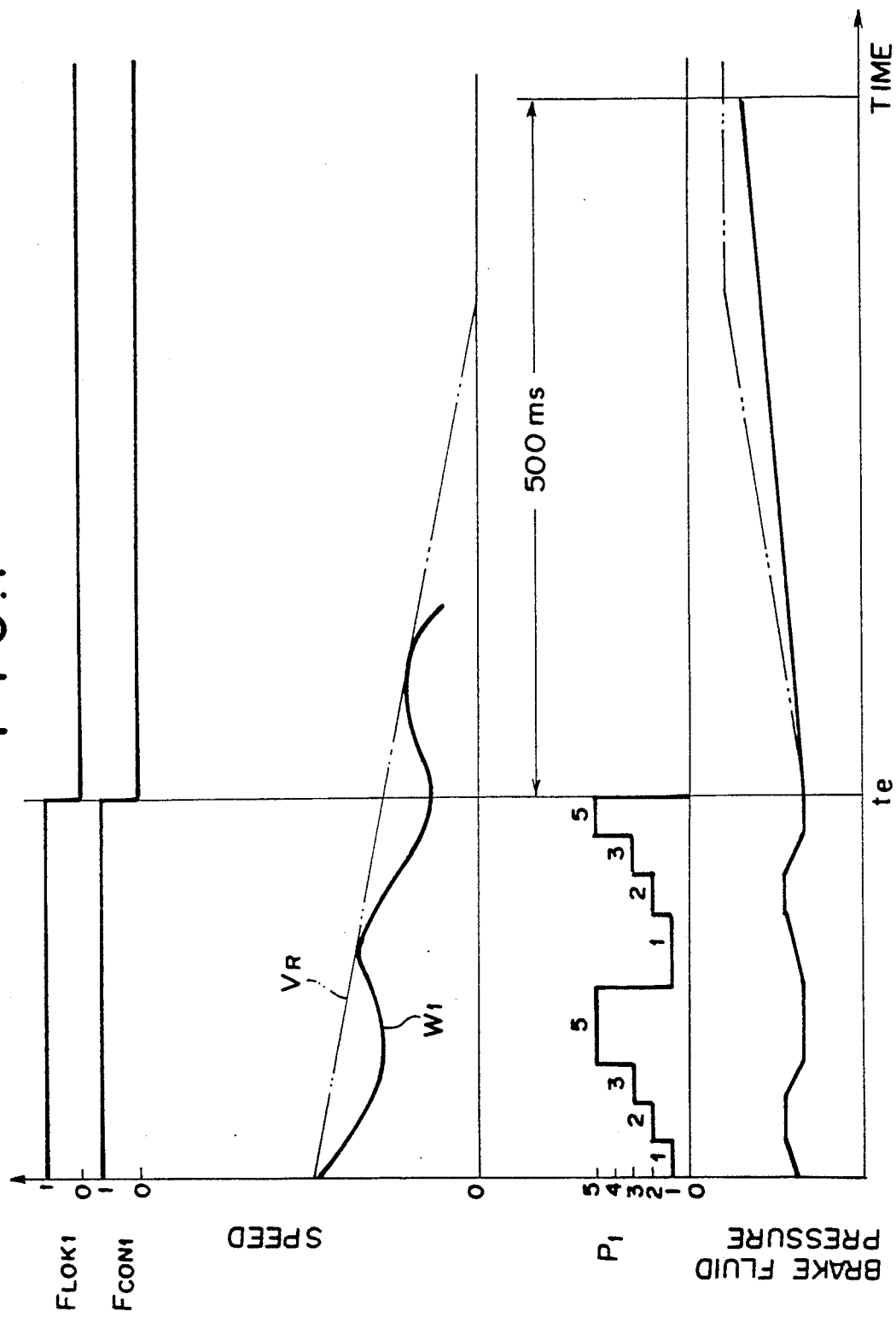

If the friction coefficient $MU_1$ has been set to 1 at the time $t_e$, the control unit 24 sets the controlled variable to the value for slowly increasing the braking pressure and outputs a braking pressure control signal representing the value of the controlled variable to the first valve unit 20 (steps U5 and U6 in FIG. 5), whereby the braking pressure is gradually increased from the time $t_e$ as shown by the solid line in FIG. 7 and locking or skid of the left front wheel 1 can be avoided. Further since the same control is performed also to the second and third channels immediately before stop of the vehicle, locking or skid of all the wheels prevented and the vehicle can be stably stopped even on a low friction coefficient road like frozen road.

On the other hand, if the friction coefficient $MU_1$ has been set to 3 at the time $t_e$, the control unit 24 sets the controlled variable to the value for increasing the braking pressure at the normal rate and outputs a braking pressure control signal representing the value of the controlled variable to the first valve unit 20, whereby the braking pressure is more rapidly increased and the vehicle is surely stopped.

What is claimed is:

1. An antiskid brake system for a vehicle comprising a wheel speed sensor which detects the rotational speed of a wheel of the vehicle, a braking pressure changing means which controls braking pressure applied to the wheel brake cylinder and a control means which controls the braking pressure changing means so that the braking pressure is reduced when a wheel-speed-based value obtained from a rotational speed of the wheel detected by the wheel speed sensor reaches a predetermined value and is increased when an acceleration of the wheel reaches a predetermined value after reduction of the braking pressure, characterized in that said control means is provided with a vehicle speed sensor and a road friction coefficient detecting means and causes said braking pressure changing means to increase the braking pressure at a predetermined rate when the acceleration of the wheel reaches said predetermined value after reduction of the braking pressure in a low vehicle speed range which is lower than a predetermined vehicle speed, said predetermined rate of increase in the braking pressure being independent from the rotational speed of the wheel detected by said wheel speed sensor and being changed with the friction coefficient of the road surface so that said predetermined rate reduces as the friction coefficient of the road surface reduces.

2. An antiskid brake system as defined in claim 1 in which said vehicle speed sensor calculates a pseudo-vehicle-speed on the basis of rotational speeds of each of a plurality of wheels of the vehicle, and said control means determines that the vehicle speed is in said low vehicle speed range when the pseudo-vehicle-speed is lower than a predetermined value.

3. An antiskid brake system as defined in claim 2 in which said pseudo-vehicle-speed is reduced with time at a predetermined rate which is changed depending on the friction coefficient of the road surface to be larger as the friction coefficient of the road surface increases.

4. An antiskid brake system as defined in claim 1 in which said vehicle speed sensor detects the vehicle speed on the basis of the rotational speeds of the wheels of the vehicle.

5. An antiskid brake system as defined in claim 1 in which said vehicle speed sensor calculates a pseudo-vehicle-speed on the basis of the rotational speeds of the wheels of the vehicle, and said control means determines that the vehicle speed is in said low vehicle speed range when the pseudo-vehicle-speed is lower than a predetermined value and the rotational speed of the wheel to which the braking pressure is to be controlled is lower than a predetermined value.

6. An antiskid brake system as defined in claim 1 in which said control means causes said braking pressure changing means to increase the braking pressure at said predetermined rate for a predetermined time interval when the acceleration of the wheel reaches said predetermined value in the low vehicle speed range.

7. An antiskid brake system as defined in claim 6 in which said braking pressure changing means comprises a duty solenoid valve provided in a hydraulic circuit for applying the braking pressure to the wheel brake cylinder and said control means controls the duty of the duty solenoid valve to increase the braking pressure at said predetermined rate.

8. An antiskid brake system as defined in claim 1 in which said wheel-speed-based value is a deceleration of the wheel detected on the basis of a change in the rotational speed of the wheel.

9. An antiskid brake system as defined in claim 1 in which said wheel-speed-based value is a slip ratio of the wheel determined on the basis of a pseudo-vehicle-speed and the rotational speeds of the wheels of the vehicle.

* * * * *